Dec. 5, 1961    G. D. RHOADS ET AL    3,011,814
FLUID SEAL
Filed July 1, 1957    2 Sheets-Sheet 1
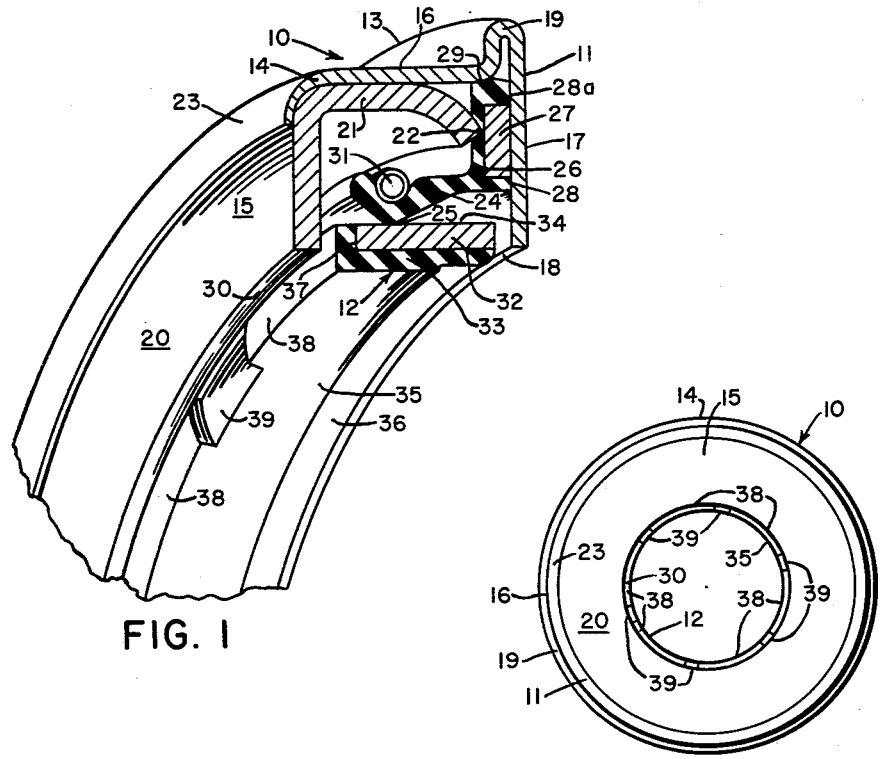
FIG. 1
FIG. 2
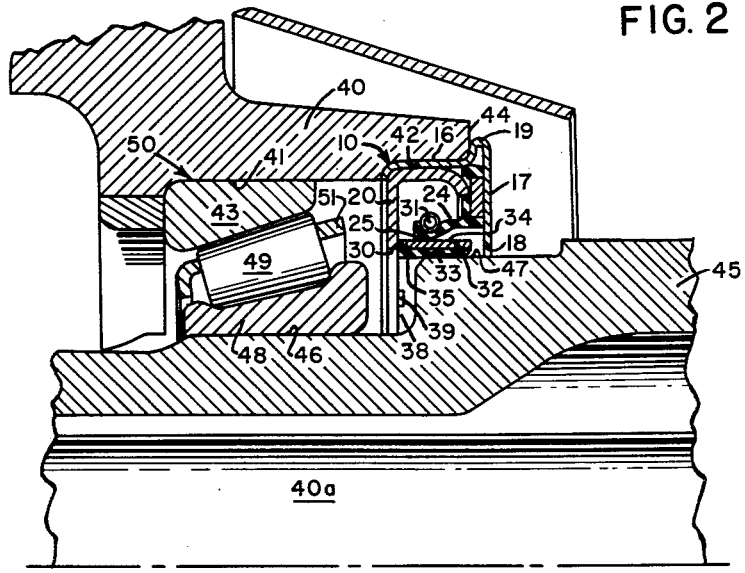
FIG. 3

# United States Patent Office 3,011,814
Patented Dec. 5, 1961

3,011,814
FLUID SEAL
George D. Rhoads, Redwood City, Calif., and George L. Corsi, Detroit, Mich., assignors to Federal-Mogul-Bower Bearings, Inc., Detroit, Mich., a corporation of Michigan
Filed July 1, 1957, Ser. No. 669,018
3 Claims. (Cl. 288—3)

This invention relates to an improved fluid-sealing device.

One important application of this new device is in sealing oil in the bearings of rear-wheel axles of automotive trucks. Since that application illustrates the nature and type of many of the problems solved by this invention, it will be used as an illustrative example. However, the principles of the invention are obviously not confined to this one particular application; so no limitation on this invention is intended by use of this example.

In the past, oil seals wore deep grooves into truck-rear-wheel axle housings. Replaceable metal wear sleeves were resorted to, but they themselves gave rise to problems. For one thing, their installation, removal, and replacement was difficult and time-consuming. An old wear sleeve was either split by a cold chisel, or driven off the axle in an operation that often took a quarter of an hour or longer. Then the new wear sleeve had to be driven on. The requirement of a tight press fit usually called for heating the new sleeve, driving it on the axle, and shrinking it into a tight fit at the desired location. This took another fifteen minutes or so and was in addition to the time it took to put in the new oil seal. Moreover, installation and removal resulted in scoring the axle housing, and the new wear ring itself was often scratched and scored during installation. Such damage to the wear ring often resulted in a surface that made accurate sealing impossible, and the seal leaked through no fault of the oil-sealing element, the leakage occurring between the wear ring and the axle housing.

Being a separate piece, the wear rings were shipped, stored, catalogued, and sold separately. Not only was this a nuisance and added expense, but the handling required was another cause of damage to the sealing surface. Furthermore, the wear rings were often made by a different manufacturer than the oil seals and, in that event, the oil-seal manufacturer had no control over the quality of the surface against which his product had to seal.

An object of the present invention is to provide a unitary device combining a novel type of wear sleeve with the oil seal as a separately rotatable but still integral part thereof.

Another object is to provide an assembly incorporating both the oil seal and wear ring in a unit that remains together during shipment, installation, operation, and removal.

Another object is to simplify installation and removal of the oil seal and wear ring and to safeguard the sealing surfaces during installation.

In general, the unit of this invention comprises a cup-shaped rigid case with a pair of spaced-apart radial flanges joined by a cylindrical wall that is itself adapted for a press fit into a housing bore. An oil-sealing member is supported in the case in a leak-tight fit, its sealing lip lying in between the radial flanges and opposite the cylindrical wall. A wear sleeve is also provided, comprising a resilient, shaft-engaging member adapted for a press-fit with the axle or other shaft, and a rigid reinforcing member with a cylindrical outer periphery that is engaged by the sealing lip in a rotating, oil-sealing relationship. The rigid member has at least a substantial portion which has a larger diameter than the inner pierce of the radial flanges of the case, and it is located between these flanges, the axial extent of this portion being shorter than the distance between the flanges but not unduly so. As a result, the wear sleeve cannot come out of the case and is always in engagement with the oil-sealing lip. The whole is made, sold, delivered, installed, operated, and removed as a unit. The use of the resilient, inner, shaft-engaging member simplifies installation and removal without in the least impairing the operation of the device.

Other objects and advantages of the invention will appear from the following description of some illustrative examples.

In the drawings:

FIG. 1 is an enlarged view in perspective and partly in section of a portion of an oil sealing device embodying the principles of the present invention.

FIG. 2 is an end elevation view of the complete device on a reduced scale, as compared with FIG. 1, and looking toward the left-hand side thereof.

FIG. 3 is a view in elevation and in section of a portion of a rear-wheel truck bearing installation in which the device of the present invention is being installed.

Figure 4:
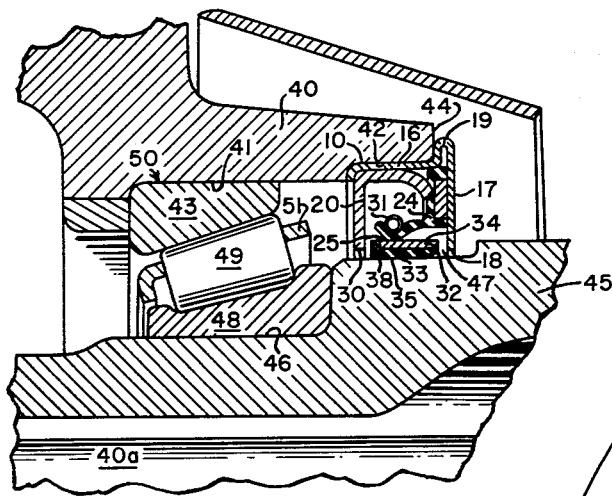
FIG. 4 is a view similar to FIG. 3 of the complete installation as it appears during operation.

An assembly 10 of the present invention shown in FIGS. 1–4 incorporates an oil seal 11 and a wear sleeve 12 combined in a novel manner. The oil seal 11 is constructed in accordance with Patent No. 2,626,169, to which reference can be made for further details. That this type of oil seal is not essential and that it is merely one example of a suitable oil seal is implied by the different structure shown in FIG. 5. A cup-like rigid case 13, preferably of metal, comprises an outer case element 14 and an inner case element 15. The outer element 14 has a cylindrical or axially extending portion 16 whose outer cylindrical surface is adapted for a press-fit into a housing bore. The element 14 also has a radial flange 17 with an inner pierce 18, and the flange 17 and cylindrical portion 16 meet at a radially-projecting stop 19, which limits entry of the seal 11 into a housing bore. However, such a stop 19 is not always required and need not be present.

The inner case element 15 has a radial flange 20 spaced from the radial flange 17 by the cylindrical portion 16. The element 15 also has an inner generally cylindrical portion 21 that extends axially toward the flange 17 and has an inner end 22 turned somewhat radially inwardly. The case 13 is clamped together by turning in the edge 23 of the outer case 14 against the flange 20.

The oil seal 11 also has a sealing member 24 having a sealing lip 25 and a radial web 26. The web 26 is supported by a rigid ring 27 that is bonded to the web 26. The sealing member 24 is held in place by the pressure of the edge 22 forcing it against the flange 17, and the web 26 has portions 28 and 28a sealing against the flange 17, and a portion 29 sealing against the rim 16. Further details are supplied by Patent No. 2,626,169.

It will be noted that the sealing element 24 lies between the radial flanges 17 and 20 opposite the cylindrical wall 16 and radially outwardly from the pierce 18 of the flange 17 and the pierce 30 of the flange 20. A garter spring 31 may urge the lip 25 inwardly sufficiently to assure contact with the wear sleeve 12, although the spring 31 is not always required.

The wear sleeve 12 comprises an outer rigid member 32 and an inner resilient member 33. The outer rigid member 32 may be steel and may simply comprise a rigid ring of rectangular cross section, shorter than the distance between the flanges 17 and 20 and, very important, lying radially outwardly of the pierces 18 and 30, so that it cannot escape from the cup-like case 13. Of course, this means that the wear sleeve 12 must be installed in place before the edge 23 is turned over to close the case 13. Preferably, the rigid member 32 has its outer cylindrical face 34 finished properly for a sealing member, and once finished and installed this face 34 is protected from damage.

The inner lining 33 may, like the sealing member 24, be made from any suitable oil-resistant elastomer such as neoprene or other synthetic rubber. For purposes not involving oil, other materials are also suitable. It should, however, be resilient. It has an inner cylindrical surface 35 normally slightly smaller than the outer surface of the axle housing about which it is to fit, with a pilot portion 36, which may be a smaller diameter axial portion or a radius portion, or a chamfer at the leading edge. The shaft interference of the portion 35 with the axle housing should be enough to assure against leakage or rotation but with less friction than the interference of the case cylindrical portion 16 with its bore.

Preferably, the elastomer is brought over at least one radial end or face 37 of the metal member 32 to prevent the metal member 32 from directly contacting the flange 20 during installation, or at any time during operation. This bumper for the face 37 preferably comprises a plurality (e.g., six) chaplets 38 with channels 39 insuring flow of oil to the lip 25.

Installation of the sealing assembly 10 is illustrated by FIGS. 3 and 4. A hub 40 is rigidly secured to the flange (not shown) of an axle shaft 40a in the conventional manner. In the hub 40 a stepped bore provides bore portions 41 and 42. The portion 41 receives the cup 43 of a tapered roller bearing assembly 50, while the bore portion 42 receives the seal case 13, the cylindrical wall 16 making a tight press-fit in the bore 42 and the stop 19 engaging a radial end wall 44. An axle housing 45 is shaped to provide stepped cylindrical surfaces 46 and 47. The surface 46 receives a bearing cone 48, and the rollers 49 ride between the cup 43 and cone 48. The surface 47 receives the wear sleeve 12, with the inner resilient lining 33 fitting snugly thereon.

For installation, the bearing 50, comprising the cone 48, cup 43, a cage 51, and rollers 49, is pushed into the bore 41 and the seal assembly 10 is pushed into the bore 42; then the entire wheel including the hub 40 is put on the axle housing 45, the cone 48 engaging the surface 46 and the wear ring portion 33 engaging the surface 47. At first (FIG. 3) the chaplets 38 abut the flange 20, and this aids in pushing the wear sleeve 12 into place. The remainder of the installation of the wheel and the axle 40a and the attachment of the axle flange to the hub 40 may then be completed. After installation, the end play of the hub 40 relative to the axle housing 45 will normally cause a shift to the position shown in FIG. 4. If not, wear on the rubber chaplets 38 will soon provide the desired clearance.

Removal is just as simple. Removal of the hub 40 carries the bearing 50 and sealing assembly 10 with it, since there is more friction between the walls 42 and 16 than between the axle housing 45 and the rubber lining 33. The flange 20 strikes the cage 51 of the bearing 50 and helps push out the whole bearing 50 intact. Then the seal assembly 10 is removed from the bore 42 and discarded and a new one installed in the same simple manner already described. No heating, driving, cold chiseling, etc., is needed. Moreover, during the operation the lip 25 rotates relatively to the wear ring portion 32 while sealing against loss of oil between them.

Figure 5:
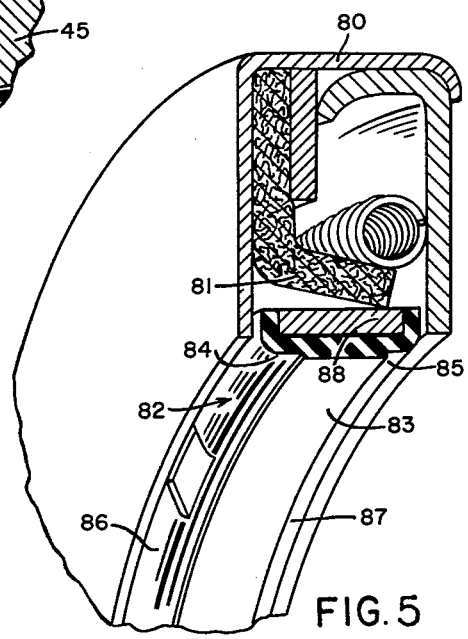
FIG. 5 is a view similar to FIG. 1 of another modified form of sealing assembly.

In the form of the invention shown in FIG. 5, the cup-shaped case 80 has nothing corresponding to the stop 19, and the sealing element 81 is leather. Also, the wear ring 82 has its elastomeric inner lining 83 provided with two pilot portions 84 and 85 and chapleted end portions 86 and 87 at both ends of the metal member 88. Otherwise, operation and installation are the same as before.

To those skilled in the art to which this invention relates, many additional changes in construction and widely differing embodiments of the invention will suggest themselves without departing from the spirit and scope of the invention as defined in the claims.

What is claimed is:

1. An assembly for sealing between a bore and a shaft, including in combination: a rigid case having a pair of spaced-apart radial flanges joined by a radially outer cylindrical wall adapted for press-fit into said bore; an annular radial shaft seal supported in said case in a leak-tight fit therewith and having an annular sealing lip opposite said cylindrical wall and between said radial flanges; and a wear sleeve having a resilient portion providing a radially inner periphery and adapted for a non-rotating fit on said shaft, and having a rigid metal reinforcing portion with a cylindrical portion providing a radially outer periphery, the diameter of said outer periphery being greater than that of the inner peripheries of said spaced-apart radial flanges, the axial length of said outer periphery being shorter than the distance between said radial flanges, said wear sleeve being positioned between said flanges with said sealing lip engaging its said outer periphery, said wear sleeve resilient portion providing an axially extending series of chaplets on one end edge of said rigid portion to space it from the adjacent radial flange.

2. An assembly for sealing between a bore and a shaft, including in combination: a rigid case having a pair of spaced-apart radial flanges joined by a radially outer cylindrical wall adapted for press-fit into said bore; an annular radial shaft seal supported in said case in a leak-tight fit therewith and having an annular sealing lip opposite said cylindrical wall and between said radial flanges; and a wear sleeve having a resilient portion providing a radially inner periphery and adapted for a non-rotating fit on said shaft, and having a rigid metal reinforcing portion with a cylindrical portion providing a radially outer periphery, the diameter of said outer periphery being greater than that of the inner peripheries of said spaced-apart radial flanges, the axial length of said outer periphery being shorter than the distance between said radial flanges, said wear sleeve being positioned between said flanges with said sealing lip engaging its said outer periphery, said wear sleeve resilient portion providing a plurality of axially extending chaplets on both end edges of said rigid portion to space it from both radial flanges.

3. An assembly for sealing between a bore and a shaft, including in combination: a rigid case having a pair of spaced-apart radial flanges joined by a radially outer cylindrical wall adapted for press-fit into said bore; an annular radial shaft seal supported in said case in a leak-tight fit therewith and having an annular sealing lip opposite said cylindrical wall and between said radial flanges; and a wear sleeve having a resilient portion providing a radially inner periphery and adapted for a non-rotating fit on said shaft, and having a rigid metal reinforcing portion with a cylindrical portion providing a radially outer periphery, the diameter of said outer periphery being greater than that of the inner peripheries of said spaced-apart radial flanges, the axial length of said outer periphery being shorter than the distance between said radial flanges, said wear sleeve being positioned between said flanges with said sealing lip engaging its said said outer periphery, the inner periphery of the wear sleeve being provided with a larger diameter pilot portion.

References Cited in the file of this patent

UNITED STATES PATENTS

| | | |
|---|---|---|
| 1,771,198 | Walter | July 22, 1930 |
| 2,266,175 | Delaval-Crow | Dec. 16, 1941 |
| 2,342,955 | Meyer | Feb. 29, 1944 |
| 2,405,120 | Evans | Aug. 6, 1946 |
| 2,522,231 | Loftis | Sept. 12, 1950 |
| 2,651,534 | Kosatka | Sept. 8, 1953 |
| 2,797,938 | Reynolds | July 2, 1957 |